United States Patent
Guo et al.

(10) Patent No.: US 9,844,295 B2
(45) Date of Patent: Dec. 19, 2017

(54) COFFEE MACHINE

(75) Inventors: Jiangang Guo, Guangdong (CN);
Yongchun Zeng, Guangdong (CN);
Hou Xiong, Guangdong (CN)

(73) Assignee: Guangdong Xinbao Electric Joint-Stock Ltd., Leliu Town (CN)

( * ) Notice: Subject to any disclaimer, the term of this patent is extended or adjusted under 35 U.S.C. 154(b) by 1274 days.

(21) Appl. No.: 13/825,962

(22) PCT Filed: Jan. 16, 2011

(86) PCT No.: PCT/CN2011/070307
§ 371 (c)(1),
(2), (4) Date: May 13, 2013

(87) PCT Pub. No.: WO2012/037785
PCT Pub. Date: Mar. 29, 2012

(65) Prior Publication Data
US 2013/0220141 A1    Aug. 29, 2013

(30) Foreign Application Priority Data

Sep. 26, 2010   (CN) .......................... 2010 1 0293001

(51) Int. Cl.
*A47J 31/46* (2006.01)
*A47J 31/06* (2006.01)
*A47J 31/44* (2006.01)

(52) U.S. Cl.
CPC ............... *A47J 31/46* (2013.01); *A47J 31/06* (2013.01); *A47J 31/4475* (2013.01); *A47J 31/4478* (2013.01)

(58) Field of Classification Search
CPC .... A47J 31/06; A47J 31/4475; A47J 31/4478; A47J 31/46

(Continued)

(56) References Cited

U.S. PATENT DOCUMENTS 5,911,810 A * 6/1999 Kawabata ........... A47J 31/3652
99/289 P
6,513,419 B2 * 2/2003 Huber ................. A47J 31/4478
426/433

(Continued)

FOREIGN PATENT DOCUMENTS

CN        2740103 Y     11/2005
CN      201208170 Y      3/2009
(Continued)

*Primary Examiner* — Quang D Thanh
*Assistant Examiner* — James Sims, III
(74) *Attorney, Agent, or Firm* — Muncy, Geissler, Olds & Lowe, P.C.

(57) ABSTRACT

A coffee machine comprises a main body (2) and a heating device (25), wherein a funnel device for coffee brewing that includes a funnel main body (17), a funnel upper cover (6) and an assembly of funnel lower cover is also provided on the main body (2) of the coffee machine. The assembly of funnel lower cover comprises a funnel lower cover (14), and a shower piece (15) which is fixed on the bottom of the funnel lower cover (14) and makes water uniformly submerge coffee powder in the funnel main body (17). A water inlet joint (6.4) which is connected with water passage of the coffee machine is provided on the funnel upper cover (6), and a water outlet joint (15.1) which is connected with the shower piece (15) is provided on the funnel lower cover (14). The water inlet joint (6.4) is connected with the water outlet joint (15.1) through a connecting pipe (15.2). The funnel upper cover (6) is connected with the funnel main body (17), and the funnel lower cover (14) is movably connected with the funnel upper cover (6). A funnel spring (13) with low-pressure function to the coffee powder is provided between the funnel upper cover (6) and the funnel lower cover (14). A funnel mandrel (6.2) that can open a one-way valve device disposed on the front part of the coffee main body (2) is provided on the front end of the funnel (Continued)

upper cover (6), and the one-way valve device is connected with an inner water outlet of the coffee main body (2).

10 Claims, 8 Drawing Sheets

(58) Field of Classification Search
USPC ...... 99/300, 302 R, 304–306, 310, 315, 318; 239/24–25; 426/433
See application file for complete search history.

(56) References Cited

U.S. PATENT DOCUMENTS

| | | | |
|---|---|---|---|
| 6,606,938 B2* | 8/2003 | Taylor | A47J 31/0642 |
| | | | 426/433 |
| 6,711,988 B1* | 3/2004 | Eugster | A47J 31/36 |
| | | | 99/283 |
| 6,843,164 B2* | 1/2005 | Drobeck | A47J 31/402 |
| | | | 99/280 |
| 7,669,519 B2* | 3/2010 | Pope | A47J 31/4478 |
| | | | 134/25.4 |
| 2003/0205146 A1 | 11/2003 | Chang | |
| 2004/0055472 A1* | 3/2004 | Stoner | A47J 31/3685 |
| | | | 99/295 |
| 2005/0145112 A1 | 7/2005 | Scribner | |

FOREIGN PATENT DOCUMENTS

| | | |
|---|---|---|
| CN | 201409814 Y | 2/2010 |
| JP | 2000175824 A | 6/2000 |

\* cited by examiner

COFFEE MACHINE

CROSS REFERENCE TO RELATED APPLICATIONS

This application is a U.S. National Stage of International Application No. PCT/CN2011/070307, filed on Jan. 16, 2011, for which priority is claimed under 35 U.S.C. §120; and this application claims priority of Application No. 201010293001.1 filed in China on Sep. 26, 2010 under 35 U.S.C. §119, the entire contents of all of which are hereby incorporated by reference.

FIELD OF THE INVENTION

The present invention relates to a coffee machine and, in particular, to a drip coffee machine capable of providing a low pressure.

BACKGROUND OF THE INVENTION

Drip coffee machines available on the market directly use a heating device to heat water and flows the heated water through a spray to uniformly distribute the water onto coffee powder when brewing coffee. During this process, no pressure is applied on the coffee powder, resulting in incomplete extraction of coffee powder. In addition, the currently available coffee machines are not able to serve both large and small containers. Furthermore, the water outlets of conventional machines are not designed in favor of energy saving and safety consideration.

SUMMARY OF THE INVENTION

An object of the present invention is to provide a coffee machine that is convenient to operate and clean and has high security and reliability. The coffee machine provided by the present invention greatly reduces brewing time of coffee while improving its quality.

To achieve the object, a coffee machine is provided which comprises a main body, a heating device disposed within the main body, and a funnel device for coffee brewing provided on the main body, the funnel device for coffee brewing includes a funnel main body, as funnel upper cover and an assembly of funnel lower cover. The assembly of funnel lower cover comprises a funnel lower cover, and a shower piece which is fixed on the bottom of the funnel lower cover and makes water uniformly submerge coffee powder in the funnel main body. A water inlet joint which is connected with water passage of the coffee machine is provided on the funnel upper cover which is further connected to the main body of the coffee machine through a water inlet fixing bracket, and a water outlet joint which is connected with the shower piece is provided on the funnel lower cover. The water inlet joint is connected with the water outlet joint through a connecting pipe. The funnel upper cover is connected with the funnel main body, and the funnel lower cover is movably connected with the funnel upper cover. A funnel spring with low-pressure function to the coffee powder is provided between the funnel upper cover and the funnel lower cover. A funnel mandrel that can open a one-way valve device disposed on the front part of the coffee main body is provided on the front end of the funnel upper cover, and the one-way valve device is connected with an inner water outlet of the coffee main body.

A main body upper cover is provided on the top of the main body of the coffee machine and a funnel cover extension is provided on the top of the funnel upper cover. The funnel upper cover is mounted into a main body support of the main body of the coffee machine with aid of the funnel cover extension and located by as position limiting block and an upper cover position limiting element provided on the main body upper cover. The position limiting block is disposed on the funnel upper cover and a reset spring is attached to the bottom of the position limiting block. The position limiting block is positioned at top by a handle cover of the funnel.

The one-way valve device comprises a valve body, a spring disposed within the valve body, a valve cover disposed at front of the valve body, and a water inlet sealing ring provided at front of the valve cover. The front end of the spring abuts against the front end of the valve cover. A spray mandrel abuts against the bottom end of the valve cover. The spray mandrel is capable of opening a water outlet passage located between the valve cover and the water inlet sealing ring.

A micro switch contacting rod is provided at a side of the funnel upper cover and capable of contacting with the spray mandrel when the water outlet passage is open. The movement of the contacting rod switches on the micro switch which is connected to a pump disposed at bottom of the main body of the coffee machine.

A funnel sealing ring is provided between the funnel lower cover and the funnel main body. The funnel lower cover is in sealed connection with the funnel main body through the funnel sealing ring.

A connection means is provided on the funnel main body, connectable to the funnel upper cover at top end thereof. The funnel lower cover is screwed to a snap joint located within the funnel upper cover. The funnel lower cover is able to move freely from top to bottom and positioned by a position limiting element of the funnel cover.

The funnel upper cover is movably connected to the funnel lower cover through another snap joint.

A sliding rail is provided on the funnel lower cover at the interface with reference to the funnel upper cover. The snap joint located within the funnel upper cover is coupled to the sliding rail of the funnel lower cover. A plurality of barriers is provided on the funnel lower cover at its top and bottom for controlling its movement space.

A funnel filter is provided at the bottom of the funnel main body. The funnel filter is attached to the funnel main body through a pressing sheet of the funnel filter and a water outlet cover of the funnel.

A receiving tray or cup is disposed below the funnel main body, which can also be replaced with a smaller container. A concave is provided below the main body of the coffee machine for limiting the position of the receiving tray. The funnel main body has a cylindrical shape.

The coffee machine provided by the present invention can greatly reduce the brewing time and the concentration of the coffee is adjustable. The quality and taste is also improved. The one-way valve device is fixed to the fixing bracket of the main body, so that when the funnel is mounted in place, the spray mandrel functions on the one-way valve cover and open the water passage, such that water can flow through the spray. When the upper cover is opened at any cases, the spray mandrel releases from the valve cover and the valve cover will be in sealing contact with the sealing ring under the effect of the spring disposed within the one-way valve body to close the water passage. In the meanwhile, the pump is stopped and the water will be retained within the heater, so that the heater will not heat repeatedly, so as to achieve save energy. In addition, the receiving tray can be replaced

In the figures, 1-main body upper cover, 1.1-upper cover position limiting element, 2-main body of coffee machine, 2.1-fixing bracket of main body, 2.2-main body support, 3-handle cover of funnel, 4-position limiting block, 5-reset spring, 6-funnel upper cover, 6.1-funnel cover extension, 6.2-funnel mandrel, 6.3-snap joint of funnel cover, 6.4-water inlet joint, 7-micro switch, 8-one-way valve cover, 9-water inlet sealing ring, 10-water inlet fixing bracket, 11-one-way valve body, 12-contacting rod of micro switch, 13-funnel spring, 14-funnel lower cover, 14.1-position limiting element of funnel cover, 14.2-sliding rail, 15-spray sheet, 15.1-water outlet joint, 15.2-connection pipe, 1.6-funnel sealing ring, 17-funnel main body, 18-pressing sheet of filter, 19-water outlet cover of funnel, 20-filter, 21-receiving cup, 22-coffee powder, 23-receiving tray, 24-pump, 25-heating device, 26-concave.

DETAILED DESCRIPTION OF THE INVENTION

Figure 1:
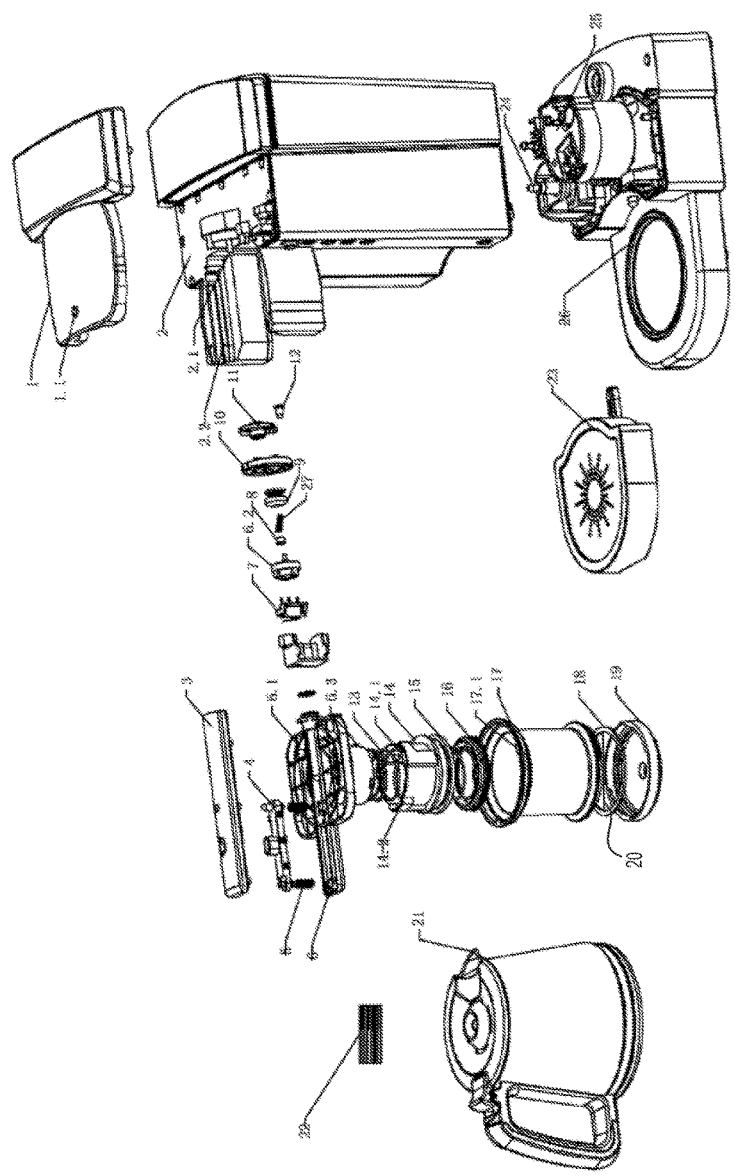
FIG. 1 is a schematic view of a coffee machine according to one example of the present invention.
Figure 2:
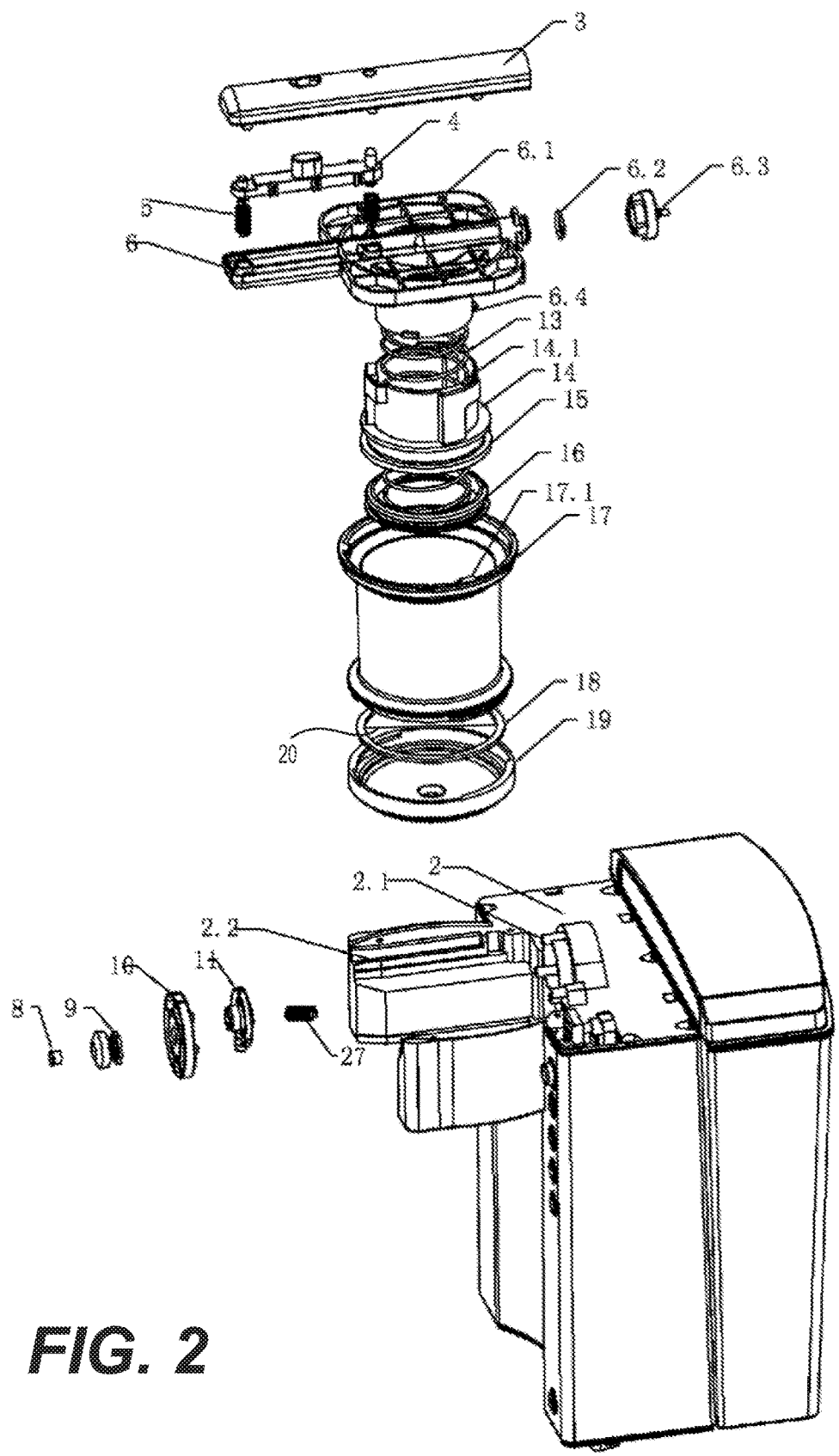
FIG. 2 shows the low pressure funnel used in the present invention in more detail.
Figure 3:
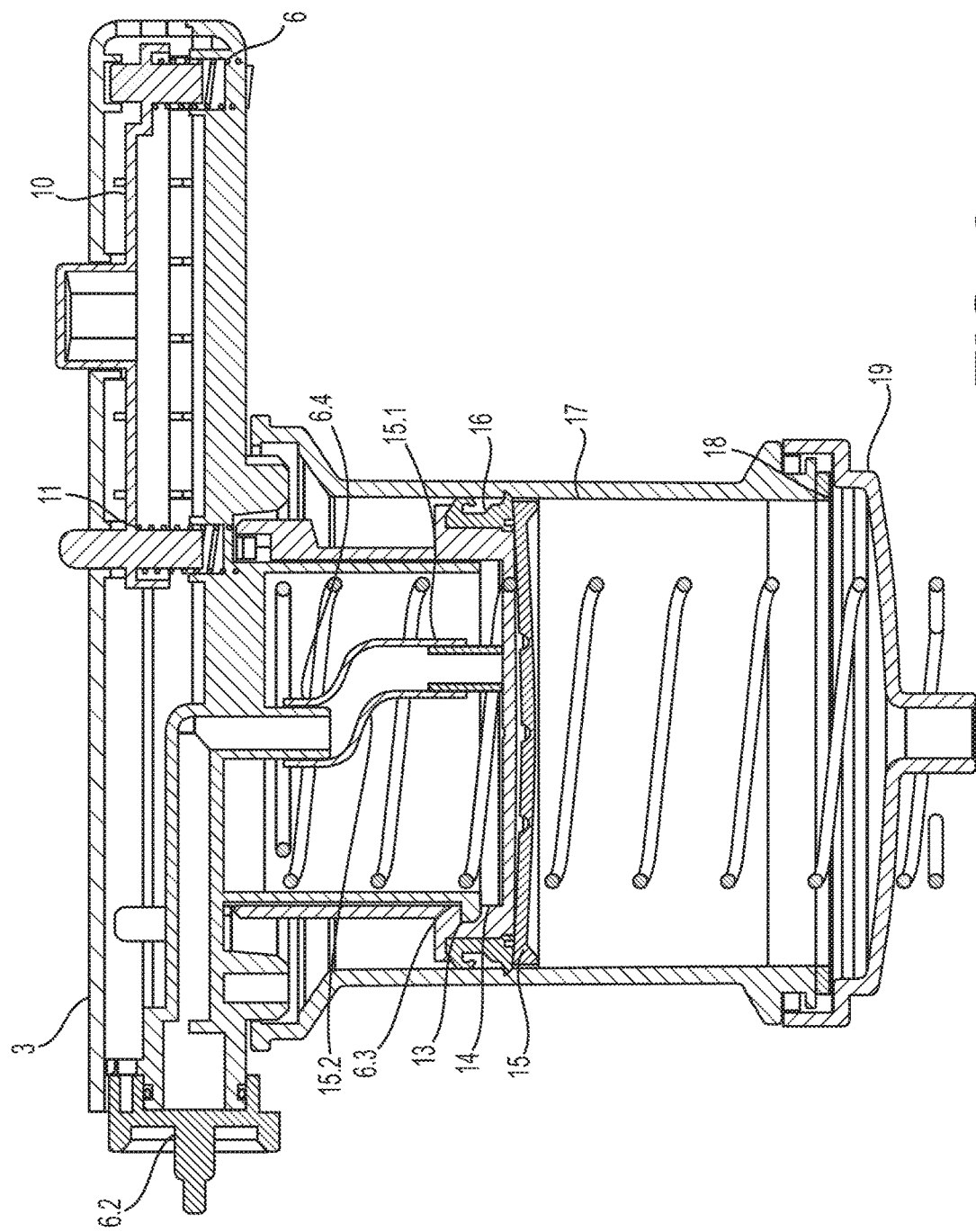
FIG. 3 shows the one-way valve device used in the present invention.
Figure 4:
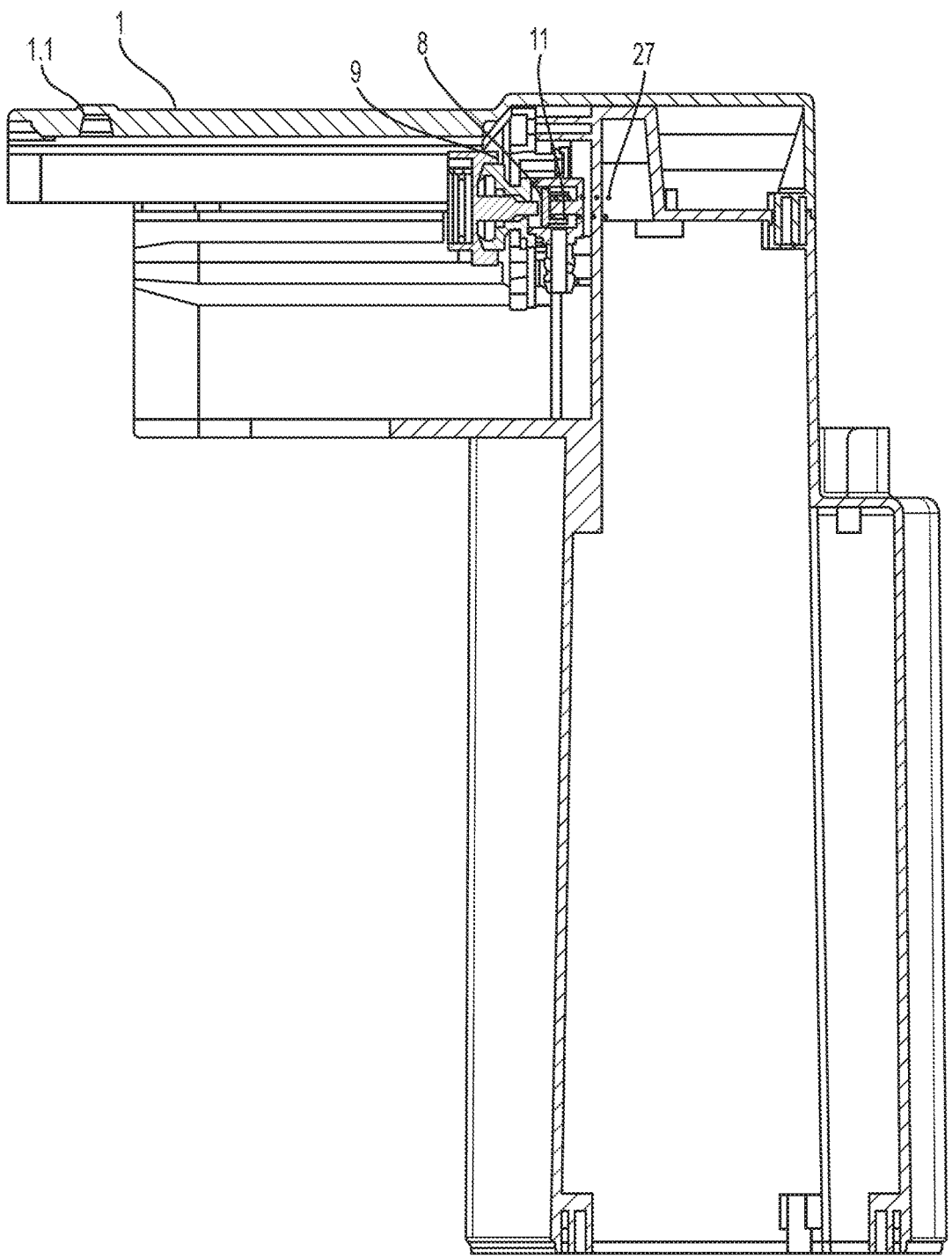
FIG. 4 is a sectional view of the low pressure funnel.
Figure 5:
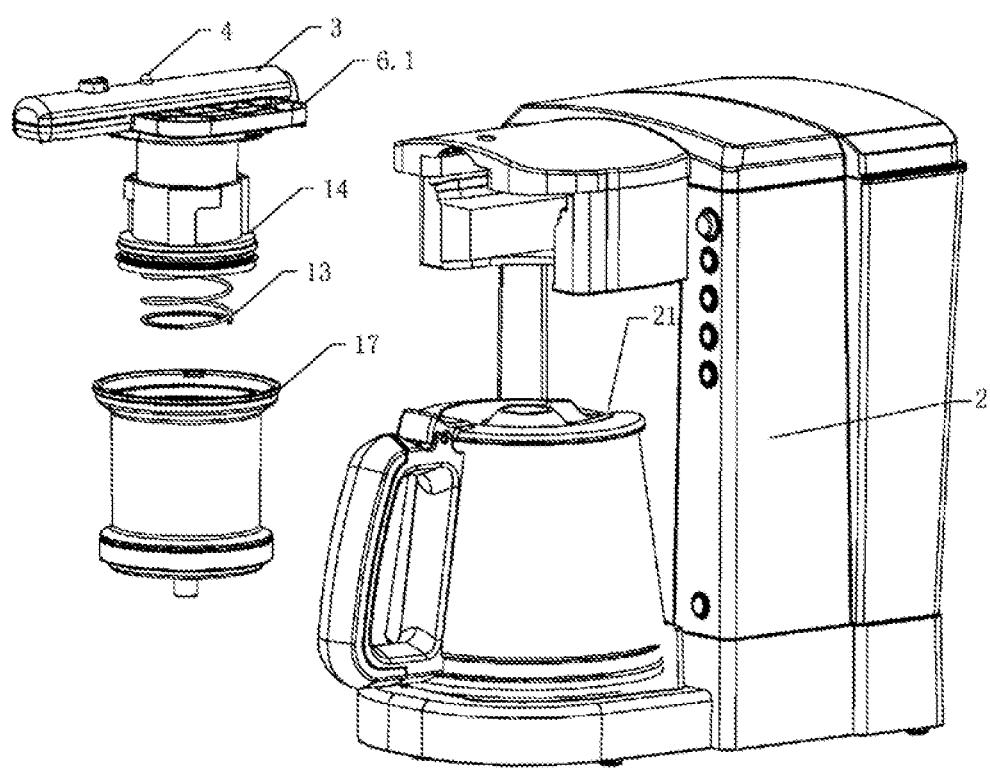
FIG. 5 is a sectional view of the one-way valve device.
Figure 6:
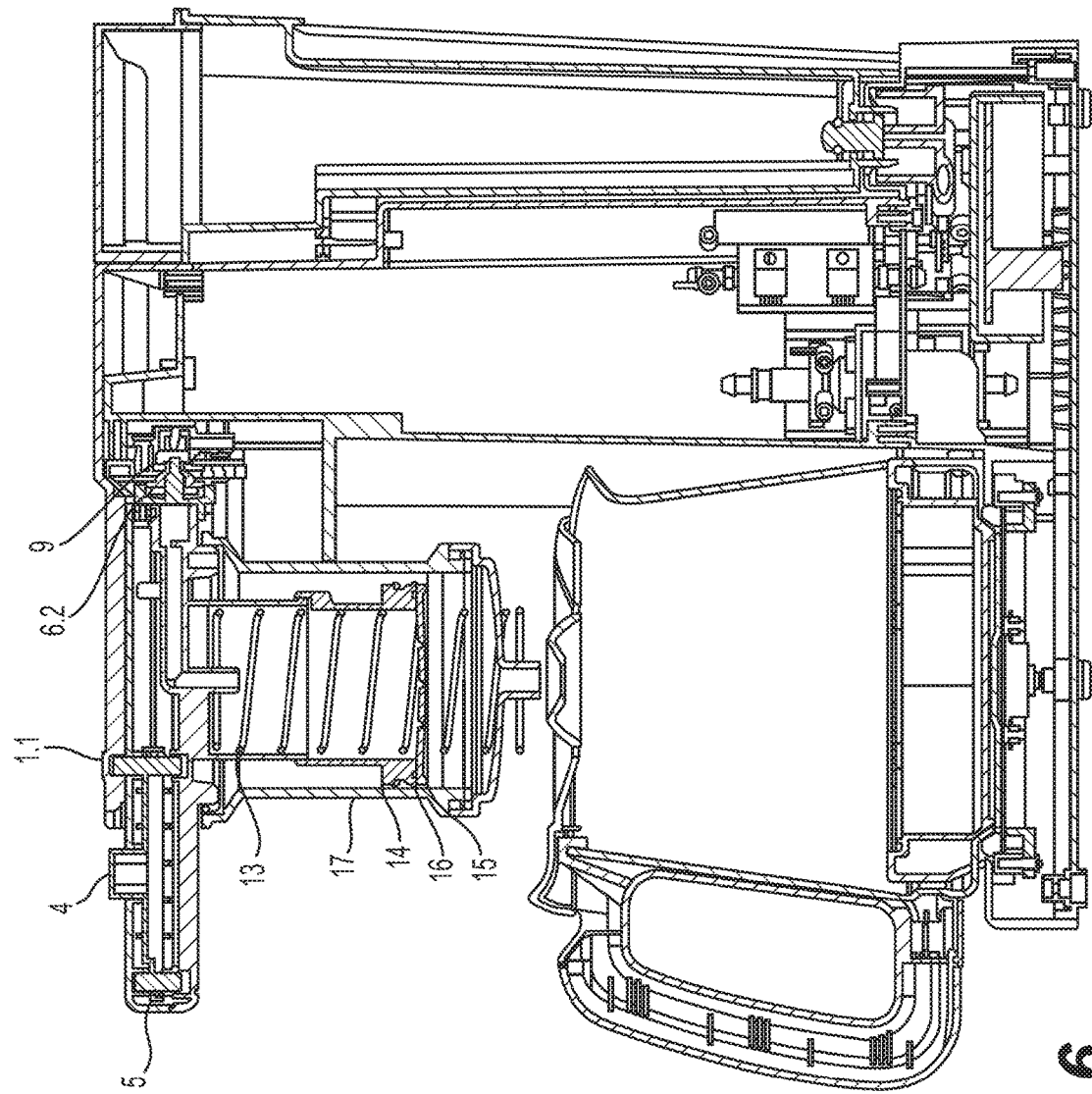
FIG. 6 shows that the funnel upper cover is open for filling coffee powder.
Figure 7:
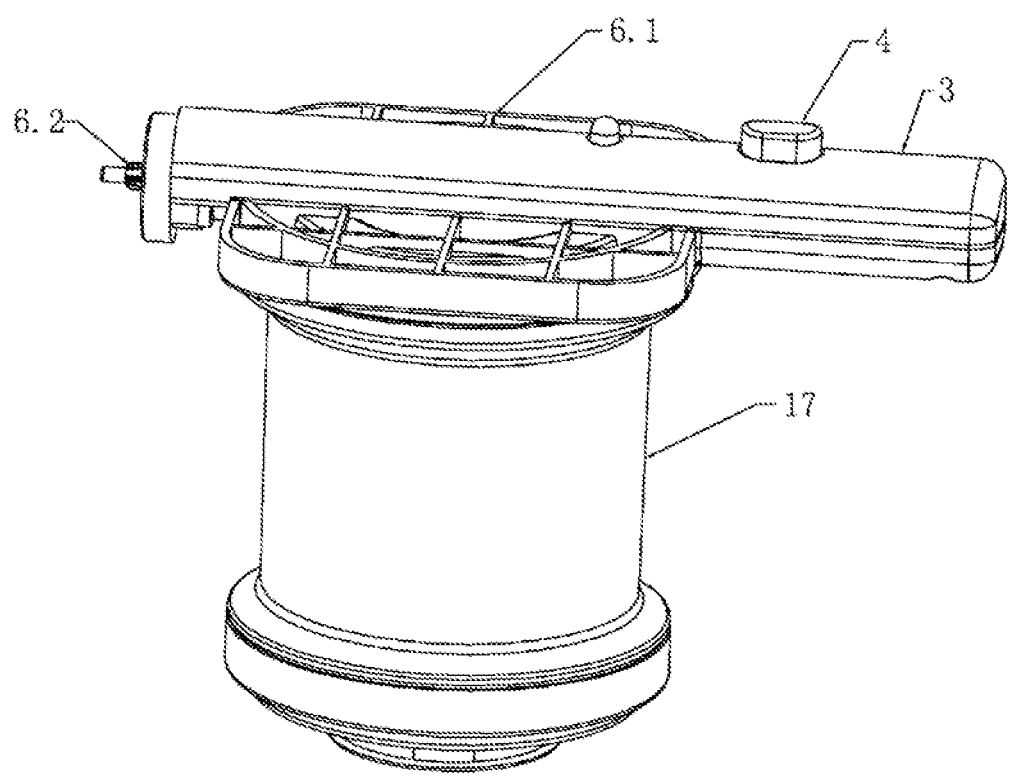
FIG. 7 shows that a glass cup is used for receiving coffee.
Figure 8:
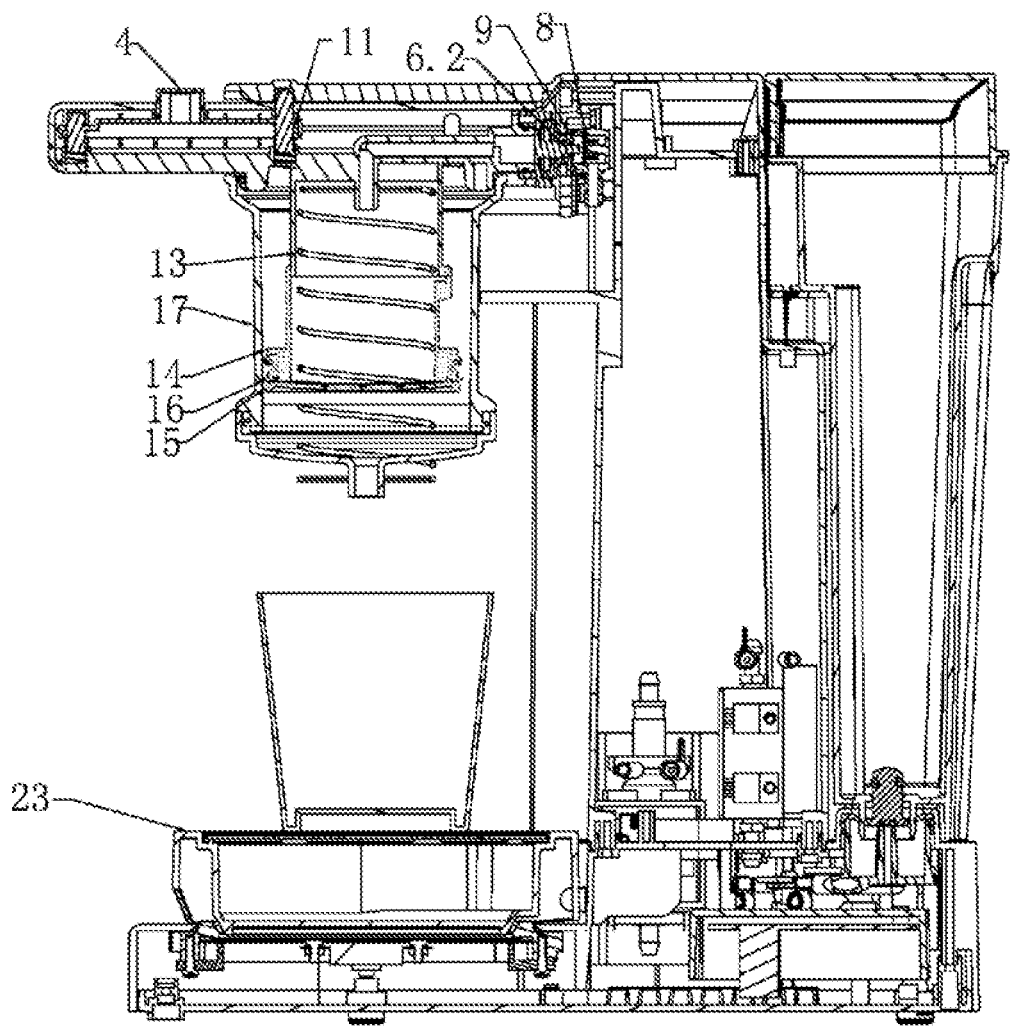
FIG. 8 shows that a cup cushion is used for small cup.

An exemplary coffee machine is shown in FIGS. 1-4, which comprises a main body 2 and a heating device 25 disposed within the main body 2. A funnel device for coffee brewing that includes a funnel main body 17, a funnel upper cover 6 and an assembly of funnel lower cover is also provided on the main body 2 of the coffee machine. The assembly of funnel lower cover comprises a funnel lower coven 14, and a shower piece 15 which is fixed on the bottom of the funnel lower cover 14 and makes water uniformly submerge coffee powder in the funnel main body 17. A water inlet joint 6.4 which is connected with water passage of the coffee machine is provided on the funnel upper cover 6, and a water outlet joint 15.1 which is connected with the shower piece 15 is provided on the funnel lower cover 14. The water inlet joint 6.4 is connected with the water outlet joint 15.1 through a connecting pipe 15.2. The funnel upper cover 6 is connected with the funnel main body 17, and the funnel lower cover 14 is movably connected with the funnel upper cover 6. A funnel spring 13 with low-pressure function to the coffee powder is provided between the funnel upper cover 6 and the funnel lower cover 14. A funnel mandrel 6.2 that can open a one-way valve device disposed on the front part of the coffee main body 2 is provided on the front end of the funnel upper cover 6, and the one-way valve device is connected with an inner water outlet of the coffee main body 2.

A main body upper cover 1 is provided on the top of the main body 2 of the coffee machine and a funnel cover extension 6.1 is provided on the top of the funnel upper cover 6. The funnel upper cover 6 is mounted into a main body support 2.2 of the main body 2 of the coffee machine with aid of the funnel cover extension 6.1 and located by a position limiting block 4 and an upper cover position limiting element 1.1 provided on the main body upper cover 1. The position limiting block 4 is disposed on the funnel upper cover 6 and a reset spring 5 is attached to the bottom of the position limiting block 4. The position limiting block 4 is positioned at top by a handle cover 3 of the funnel.

A snap joint 17.1 is provided on the funnel main body 17, connectable to the funnel upper cover 6 at top end thereof.

The one-way valve device comprises a valve body 11, a spring 27 disposed within the valve body 11, a valve cover 8 disposed at front of the valve body 11, and a water inlet sealing ring 9 provided at front of the valve cover 8. The front end of the spring 27 abuts against the front end of the valve cover 8. A spray mandrel 6.2 abuts against the bottom end of the valve cover 8. The spray mandrel 6.2 is capable of opening a water outlet passage located between the valve cover 8 and the water inlet sealing ring 9.

A micro switch contacting rod 12 is provided at a side of the funnel upper cover 6 and capable of contacting with the spray mandrel 6.2 when the water outlet passage is open. The movement of the contacting rod switches on the micro switch 7 which is connected to a pump 24 disposed at bottom of the main body of the coffee machine.

When the funnel is mounted in place, the spray mandrel 6.2 functions on the one-way valve cover 8 and open the water passage, such that the funnel upper cover 6 contacts the contacting rod 12 so as to switch on the micro switch 7. When the funnel is removed horizontally, the funnel upper cover 6 is released from the contacting rod 12 under the three of spring 27 so as to switch off the micro switch 7. The pump 24 will stop operating and no water will flow out.

In the present example, a funnel sealing ring 16 is provided between the funnel lower cover 14 and the funnel main body 17. The funnel lower cover 14 is in sealed connection with the funnel main body 17 through the funnel sealing ring 16.

In the present example, the funnel lower cover 14 is screwed to a snap joint 6.3 located within the funnel upper cover 6. The funnel lower cover 14 is able to move freely from top to bottom.

The funnel upper cover 6 and the funnel lower cover 14 are movably connected. in the present example, a sliding rail 14.2 is provided on the funnel lower cover 14 at the interface with reference to the funnel upper cover 6. The snap joint located within the funnel upper cover 6 is coupled to the sliding rail 14.2 of the funnel lower cover 14. A plurality of barriers is provided on the funnel lower cover 14 at its top and bottom for controlling its movement space.

A funnel filter 20 is provided at the bottom of the funnel main body 17. The funnel filter 20 is attached to the funnel main body 17 through a pressing sheet 18 of the funnel filter 20 and a water outlet cover 19 of the funnel 17.

A receiving tray 23 or cup 21 is disposed below the funnel main body 17, which can also be replaced with a smaller container. A concave 26 is provided below the main body 2 of the coffee machine for limiting the position of the receiving tray 23. The funnel main body 17 has a cylindrical shape.

The coffee machine is operated as follows. When making coffee, the funnel is removed by pressing the position limiting block and coffee powder 22 is loaded. After that, the funnel main body 17 is covered by funnel upper cover 6 and secured therewith. The funnel is then returned back to its position with aid of the position limiting block 4 and position limiting element of main body upper cover 1. The receiving cup 21 or tray 23 is placed under the funnel. The coffee machine is then powered and the heating device 25 is heated rapidly. When the heating device 25 reaches a predetermined temperature, the pump 24 is actuated. The water will be pumped from the water tank to flow through the heating device 25 where the water is rapidly heated. The hot water flows through the one-way valve and uniformly distributes onto the coffee powder through the spray. The coffee powder 22 is pressed by the funnel lower cover due to the force of the funnel spring 13, so the coffee powder is extracted under a low pressure. The extract coffee liquid flows through the filter 20 and into the receiving cup 21 or a smaller container disposed on the receiving tray 23. When the brewing procedure is completed, the funnel main body 17 can be taken out from the main body of the coffee machine by pressing the position limiting block 4 on the funnel upper cover 6. The coffee powder or filtering paper with the coffee powder can be discharged by open the funnel upper cover 6. The funnel lower cover 14 and the funnel main body 17 can also be separated from the main body 2 of the coffee machine for cleaning purpose.

During brewing, if the funnel is taken out by mistake, the funnel upper cover 6 will be detached from the contacting rod 12, thus the micro switch 7 is switched off. In turn, the pump 24 is stopped and no water will flow out, being safe to users.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A coffee machine comprising
   a main body,
   a heating device disposed within the main body, and
   a funnel device for coffee brewing provided on the main body,
   wherein the funnel device for coffee brewing includes
      a funnel main body,
      a funnel upper cover, and
      an assembly of funnel lower cover comprising
         a funnel lower cover, and
         a shower piece which is fixed on a bottom of the funnel lower cover and distributes water onto coffee powder in the funnel main body,
   wherein a water inlet joint which is connected with a water passage of the coffee machine is provided on the funnel upper cover which is further connected to the main body of the coffee machine through a water inlet fixing bracket, and a water outlet joint which is connected with the shower piece is provided on the funnel lower cover;
   wherein the water inlet joint is connected with the water outlet joint through a connecting pipe, the funnel upper cover is connected with the funnel main body, and the funnel lower cover is movably connected with the funnel upper cover;
   wherein a funnel spring with low-pressure function to the coffee powder is provided between the funnel upper cover and the funnel lower cover;
   wherein the funnel device includes a funnel mandrel which is disposed on a front end of the funnel upper cover and connected with the water inlet joint, the funnel mandrel opens a one-way valve device disposed on a front part of the main body of the coffee machine, and the one-way valve device is connected with an inner water outlet of the main body of the coffee machine.

2. The coffee machine according to claim 1, wherein a connection means is provided on the funnel main body, connectable to the funnel upper cover at a top end thereof, wherein the funnel lower cover is screwed to a snap joint located within the funnel upper cover, and the funnel lower cover is able to move freely from top to bottom and positioned by a position limiting element of the funnel lower cover.

3. The coffee machine according to claim 2, wherein the funnel upper cover is movably connected to the funnel lower cover.

4. The coffee machine according to claim 3, wherein a sliding rail is provided on the funnel lower cover at an interface with reference to the funnel upper cover, wherein the snap joint located within the funnel upper cover is coupled to the sliding rail of the funnel lower cover, and wherein a plurality of barriers is provided on the funnel lower cover at its top and bottom for controlling its movement space.

5. The coffee machine according to claim 4, wherein a funnel filter and a water outlet cover are provided at a bottom of the funnel main body, wherein the funnel filter is attached to the funnel main body through a pressing sheet of the funnel filter and a water outlet cover of the funnel main body.

6. The coffee machine according to claim 5, wherein a receiving tray or cup is disposed below the funnel main body and the main body of the coffee machine includes a concavity to limit a position of the receiving tray, wherein the funnel main body has a cylindrical shape.

7. The coffee machine according to claim 1, wherein a main body upper cover is provided on a top of the main body of the coffee machine and a funnel cover extension is provided on a top of the funnel upper cover;
   wherein the funnel upper cover is mounted into a main body support of the main body of the coffee machine with aid of the funnel cover extension and located by a position limiting block and an upper cover position limiting element provided on the main body upper cover;
   wherein the position limiting block is disposed on the funnel upper cover and a reset spring is attached to a bottom of the position limiting block.

8. The coffee machine according to claim 1, wherein the one-way valve device comprises a valve body, a spring disposed within the valve body, a valve cover disposed at a front of the valve body, and a water inlet sealing ring provided at the front of the valve cover;
   wherein a front end of the spring abuts against a front end of the valve cover, a spray mandrel abuts against a bottom end of the valve cover, and the spray mandrel is capable of opening a water outlet passage located between the valve cover and the water inlet sealing ring.

9. The coffee machine according to claim 1, wherein a micro switch contacting rod is provided at a side of the funnel upper cover and capable of contacting with a spray mandrel when a water outlet passage is open, wherein a movement of the contacting rod switches on the micro switch which is connected to a pump disposed at a bottom of the main body of the coffee machine.

10. The coffee machine according to claim 1, wherein a funnel sealing ring is provided between the funnel lower cover and the funnel main body, the funnel lower cover being in sealed connection with the funnel main body through the funnel sealing ring.

* * * * *